(12) United States Patent
Kommuri

(10) Patent No.: US 11,875,062 B1
(45) Date of Patent: Jan. 16, 2024

(54) PROACTIVE HARDENING OF DATA STORAGE SYSTEM

(71) Applicant: Western Digital Technologies, Inc., San Jose, CA (US)

(72) Inventor: Chakradhar Kommuri, San Ramon, CA (US)

(73) Assignee: Western Digital Technologies, Inc., San Jose, CA (US)

(*) Notice: Subject to any disclaimer, the term of this patent is extended or adjusted under 35 U.S.C. 154(b) by 23 days.

(21) Appl. No.: 17/848,300

(22) Filed: Jun. 23, 2022

(51) Int. Cl.
 *G06F 12/00* (2006.01)
 *G06F 3/06* (2006.01)

(52) U.S. Cl.
 CPC .......... *G06F 3/0659* (2013.01); *G06F 3/0604* (2013.01); *G06F 3/0679* (2013.01)

(58) Field of Classification Search
 CPC ..... G06F 3/0659; G06F 3/0604; G06F 3/0679
 See application file for complete search history.

(56) References Cited

U.S. PATENT DOCUMENTS

| | | | |
|---|---|---|---|
| 7,970,983 B2 | 6/2011 | Nochimowski | |
| 9,141,554 B1 | 9/2015 | Candelaria | |
| 10,261,705 B2 | 4/2019 | Li | |
| 11,003,537 B2 | 5/2021 | Troia et al. | |
| 2007/0005874 A1* | 1/2007 | Dodge | G06F 3/0679 711/103 |
| 2009/0100215 A1 | 4/2009 | Nochimowski | |
| 2014/0317479 A1 | 10/2014 | Candelaria | |
| 2021/0011882 A1* | 1/2021 | Zhao | G06F 16/152 |
| 2021/0200631 A1 | 7/2021 | Palmer et al. | |
| 2021/0357147 A1 | 11/2021 | Li | |
| 2022/0083273 A1 | 3/2022 | Saito | |

FOREIGN PATENT DOCUMENTS

CN 108932249 B 2/2021

* cited by examiner

*Primary Examiner* — Arvind Talukdar
(74) *Attorney, Agent, or Firm* — Morgan, Lewis & Bockius LLP (57) ABSTRACT

Disclosed are systems and methods for proactively recovering files stored in flash storage devices. The method may be performed at a flash file system. The method may include receiving a write command targeting a first file in a flash memory. The method may also include generating a reference hash corresponding to the first file, and storing the reference hash in the flash memory. The method may also include receiving a read command targeting the first file. In response to receiving the read command, the method may also include: providing a request for a logical block address corresponding to the first file to the flash manager, and receiving a response for the read command. The method may also include, in accordance with a determination that one or more hashes do not map to the first file, performing a file recovery operation for a second file based on the one or more hashes.

20 Claims, 10 Drawing Sheets

PROACTIVE HARDENING OF DATA STORAGE SYSTEM

BACKGROUND

Non-volatile memory is a type of memory that can retain its stored data without a power source. Flash memory, comprised of flash-type floating-gate transistors or cells, is a non-volatile memory and has the advantage of being relatively inexpensive, although it operates under certain limitations. It is not possible to rewrite to a previously written location on flash memory without first erasing an entire memory section before they can be programmed again. Flash memory can only erase relatively large groups of cells, usually called erase blocks. Updating the contents of a single byte requires certain housekeeping operations, in which data within an erase block that is not updated must first be moved elsewhere (i.e., relocated) so that it will be preserved during the erase operation, and then moved back into place thereafter. Sometimes, some of the blocks of the flash memory, called bad blocks, are not reliable and their use should be avoided. Furthermore, some of the read or write requests to a flash memory may be misdirected, and data may become corrupted.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

A flash file system (FFS) overcomes some of the limitations described above and provides a system of data storage and manipulation on flash memory that allows the flash memory to emulate magnetic disks. Applications or operating systems interact with the flash memory using virtual addresses, rather than using physical addresses. There may be an intermediary layer between the software application and the physical device that provides a mapping (also referred to herein as a translation) from the virtual addresses into the physical addresses. While the application or operating system software may view the flash memory as having a contiguous defect-free medium that can be read or written randomly with no limitations, the physical addressing scheme has holes in its address range (due to bad blocks, for example), and pieces of data that are adjacent to each other in the virtual address range might be greatly separated in the physical address range. The intermediary layer that does the mapping described above may, for example, be implemented in part or in whole by a software driver running on the same central processing unit (CPU) on which the applications run. Alternatively or additionally, the intermediary layer may be in part or in whole embedded within a controller that controls the flash memory and serves as the interface for the main CPU of the host computer when the host computer accesses the flash memory.

Software or firmware implementations that perform such address mappings may be referred to as flash management systems or flash file systems. The term flash file system actually is a misnomer, as the implementations do not necessarily support "files" in the sense that files are used in operating systems or personal computers, but rather support block device interfaces similar to those exported by hard disk software drivers. Still, the term is commonly used, and flash file system and flash management system may be used herein interchangeably.

A flash management layer may be a computer element (e.g., implemented in hardware, software, firmware or any combination thereof—residing on any number of devices) that (i) receives requests to write data to flash or to read data from flash (for example, at a specified block); (ii) handles the requests by programming the flash or reading data from flash; and (iii) effects one or more auxiliary flash management operations (for example, housekeeping operations, address mapping, bad block management, wear-leveling, management of storage of mapping tables or other flash management tables, and error correction). Flash management layers are useful for hiding from a client at least some of the complexity of using flash memory—for example, the need to carry out housekeeping operations when writing to flash, the need to effect bad block management, the fact that data read from flash cells is sometimes unreliable and there is a need to effect error correction, the need to extend the life of the flash memory cells by wear leveling, and for the case of NAND memory—the need to operate under the constraint that NAND memory is not random access but serial access.

Figure 1A:
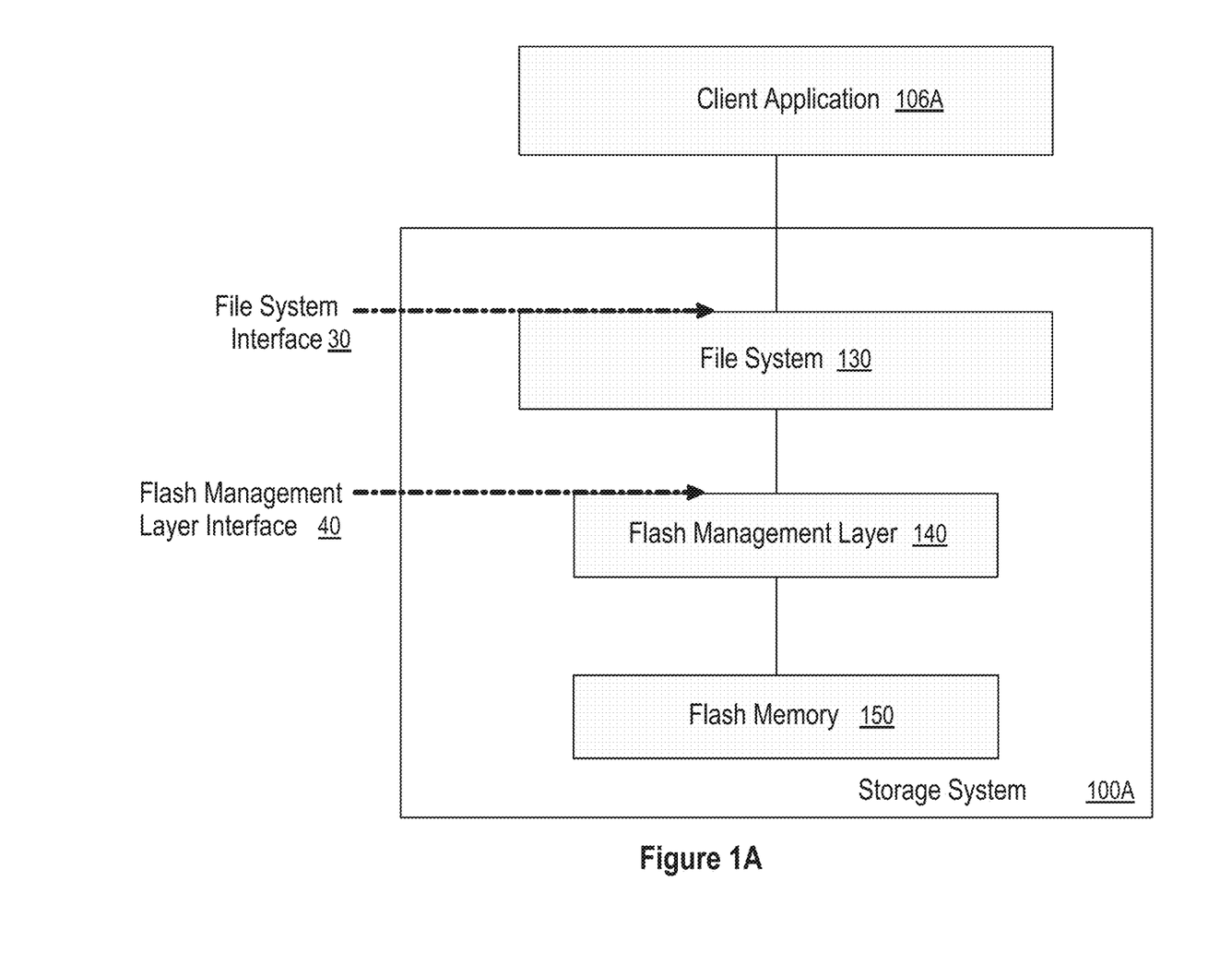
FIG. 1A illustrates a block diagram of an example data storage system, according to one or more embodiments.

FIG. 1A is a block diagram of an example data storage system 100A that includes both a file system 130 and a flash management layer 140 for directly reading from and/or writing to flash memory cells 150. A client application 106A (for example, an application executing on a personal computer, such as a host computer) sends to the file system 130 commands to store data to persistent memory and to read data from persistent memory according to a standard file-system syntax (e.g., file open, file read, filed write, etc). These file system commands are received by the file system 130 via a file system interface 30 (e.g., a logical interface through which the file system 130 receives commands according to file system syntax). Upon receiving each aforementioned data storage request or data retrieval request via the file system interface 30, the file system 130 invokes data storage or data retrieval services provided by the flash management layer 140 which hides the complexity of flash storage by presenting to the file system a block-oriented or page-oriented interface (for example, a logical block addressing (LBA) interface) or other high-level interface such as an interface 40. Thus, in the example configuration shown in FIG. 1A, there is no need for file system 130, or for client application 106A, to be aware of the specifics of flash management.

Figure 1B:
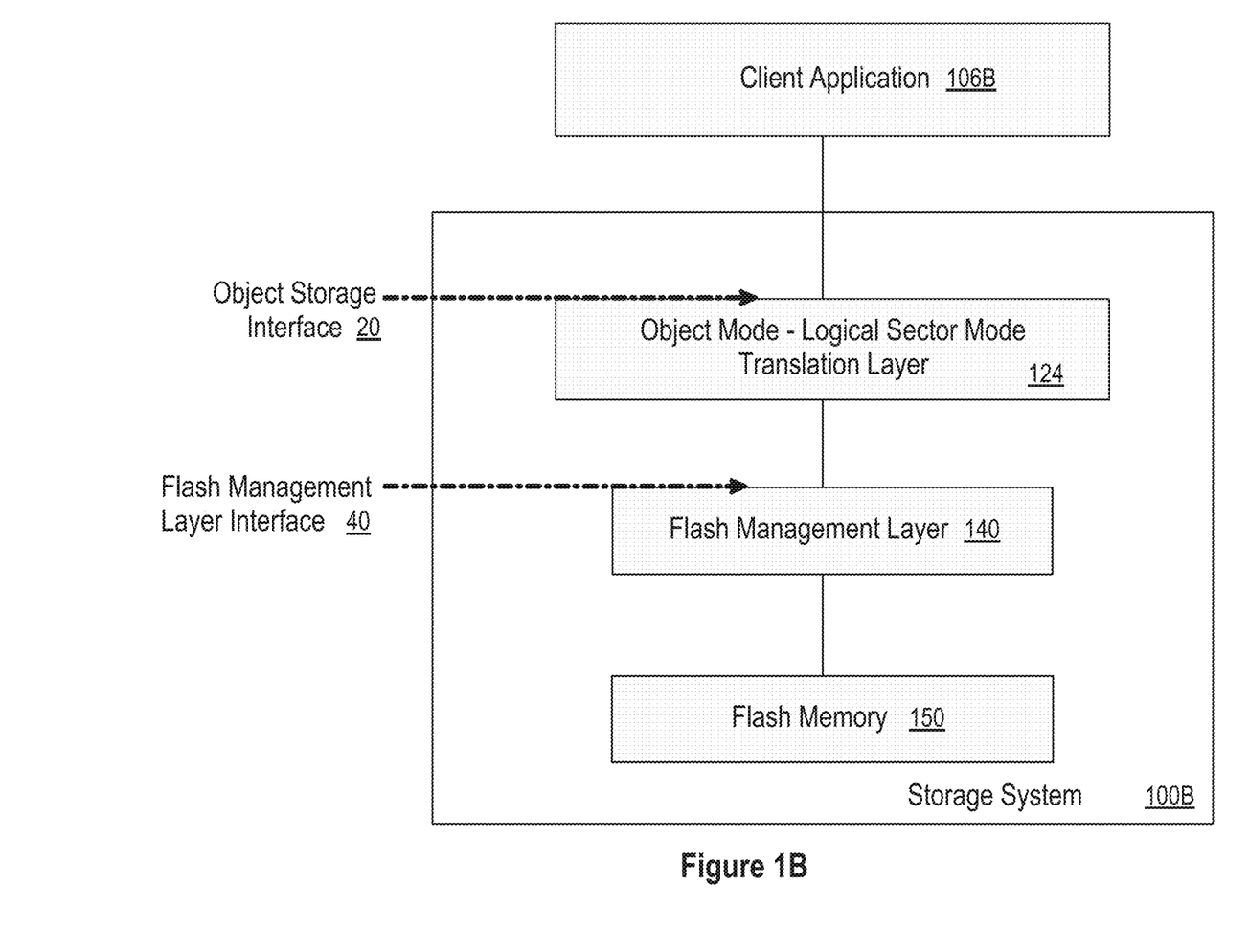
FIGS. 1B and 1C are block diagrams of example object-oriented systems, according to one or more embodiments.
Figure 1C:
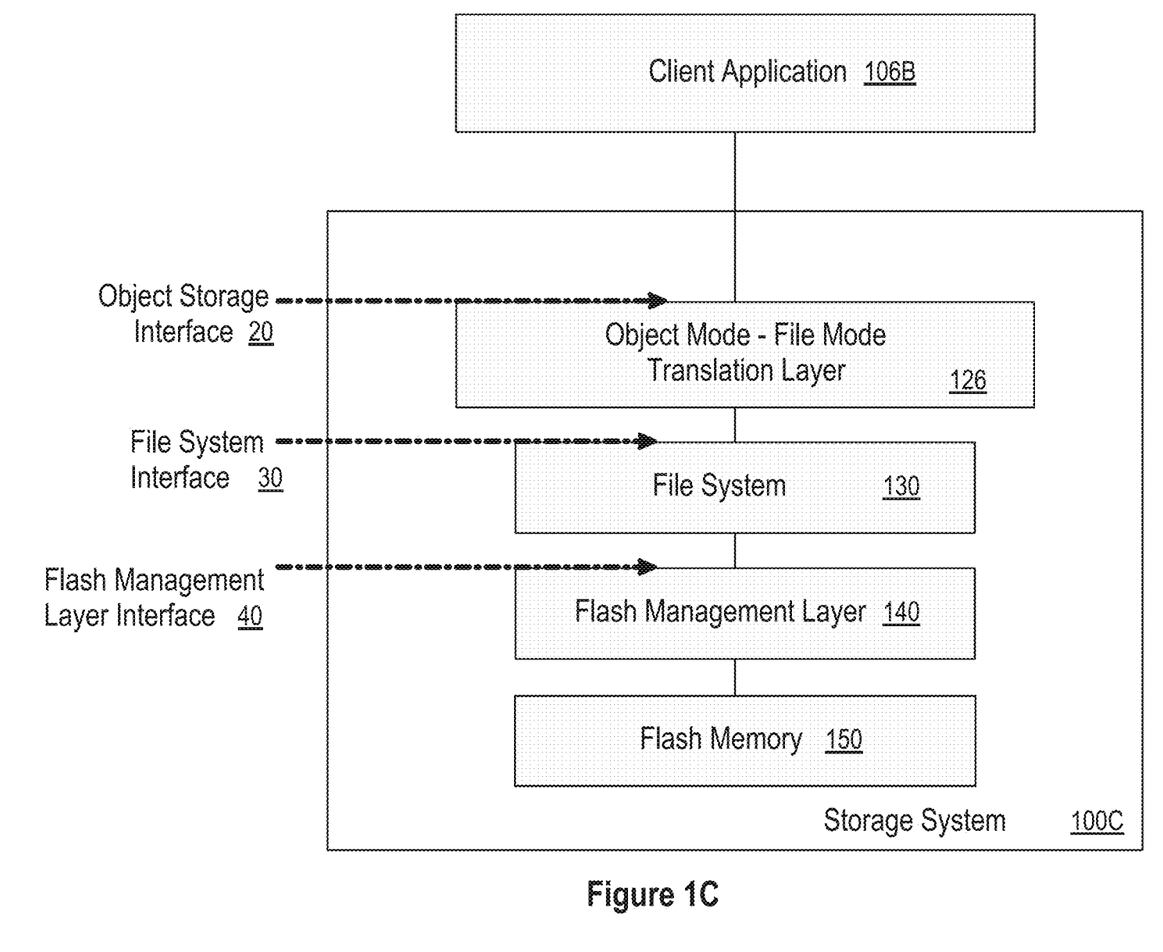

FIGS. 1B and 1C are block diagrams of example object-oriented systems (shown at data storage systems 100B and 100C, respectively) in which data is stored to, and/or retrieved from, flash memory 150. In the example shown in FIG. 1B, the client application 106B issues a request to store a data object or retrieve a data object using an object-oriented protocol such as a media transfer protocol (MTP) or an object-based storage device (OSD) protocol/command via an object-oriented storage interface 20. An object mode-logical sector mode translation layer 124 (e.g., part of an object-oriented storage system) receives the request, and sends to the flash management layer 140 corresponding read or write requests via the block-oriented interface (for example, an LBA interface) via the flash management layer interface 40. The example shown in FIG. 1C relates to a storage system that supports object-oriented storage protocols together with a legacy file system architecture. The client application 106B issues a request to store a data object or retrieve a data object using an object-oriented protocol, such as MTP or OSD via the object-oriented storage interface 20. An object mode-file mode translation layer 126 receives the request, and sends, via the file system interface 30, corresponding file-system read or write requests to the legacy file system 130.

Flash block reads (e.g., read requests to a flash memory) may occasionally result in end-to-end (sometimes referred to as E2E) errors due to misdirected input/output (I/O) due to a phenomenon called latching in which the I/O request is routed to a wrong address. For example, an I/O issued on a block B0 is sent to a block B1. Flash block managers detect this using predefined recovery mechanism. However, this recovery happens only on the block on which the given I/O is directed at (B0 in this example). Such redirections could result in data corruption on the block that the I/O is actually made to (B1, in this example). Any error on the second block (B1) is only detected when there is an I/O or an audit of that block. Additionally, such recovery is transparent to the caller (e.g., a host computer or its host application is unaware of such errors). Applications of flash storage, such as flash file systems, particularly embedded file systems, manage critical files like firmware images, persistent configurations and other vital data. However, some of these files are accessed at a very low frequency. Early detection of any issues in these files is important for data recovery.

The present description relates in general to data storage systems and methods, and more particularly to, for example, without limitation, proactively hardening flash file systems by recovering files upon indication that a file read has been misdirected to an incorrect block in a flash memory.

One or more implementations of the subject technology provide several performance benefits that improve the functionality of a computer. By proactively recovering files before the read requests for the files are received, user data in the data storage devices may be protected. In turn, a host computer coupled to the data storage devices also receives the benefits of the data storage devices' improved performance and data security.

In some aspects, a flash file system may supply a hash relating to a file along with a write request to a mapped LBA, which may be embedded into a physical block's end-to-end (E2E) data. When an E2E mismatch happens, a flash manager may pass the mismatched hash to the flash file system as part of a sense information for recovering data on the current I/O. The flash file system may read the sense information to read the mismatched hash. If a hash maps to a file, the flash file system may read the file. If the hash does not map to the file, the file may be recovered.

Figure 2:
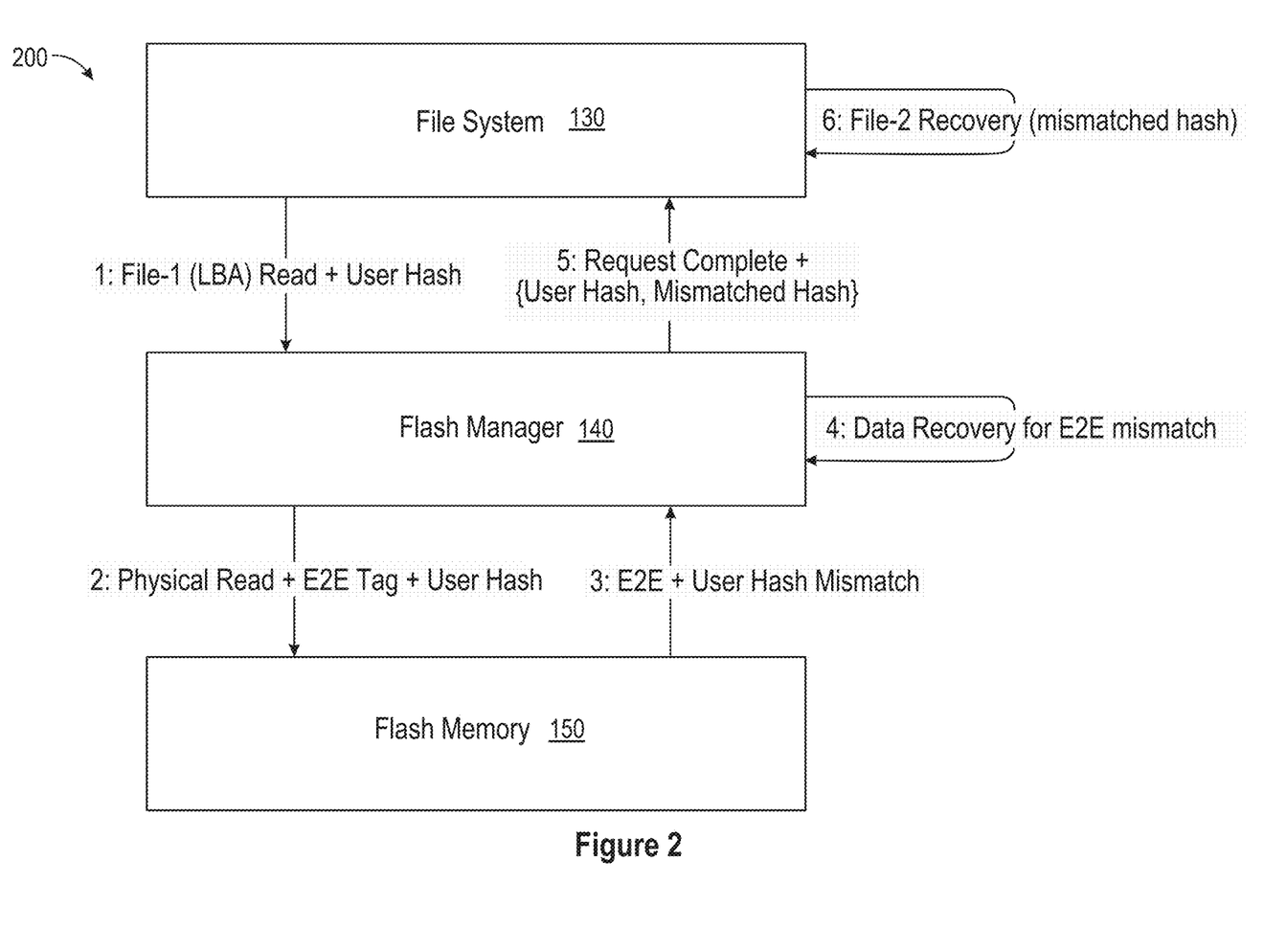
FIG. 2 is a block diagram of an example data storage system, according to one or more embodiments.

FIG. 2 is a block diagram of an example data storage system 200, according to one or more embodiments. The system 200 may be sometimes referred to as a flash storage system. The system 200 may include a file system 130 (sometimes referred to as the flash file system), a flash manager 140 (sometimes referred to as the flash management layer) and a flash memory 150 (sometimes referred to as the flash memory cells). Some features of these components are described in connection with FIGS. 1A, 1B and 1C. Additional details are described herein. The file system 130 receives a write request (sometimes referred to as a write command) for a file from a host (e.g., a client application on the host, such as the application 106A or 106B). The write request is typically accompanied by a file identifier. The file system 130 may obtain one or more LBAs corresponding to the file identifier. This may be based on, for example, retrieving an entry from a table that associates each file (or the identifier) to the one or more LBAs. The file system 130 may also generate a hash or a file hash (or may obtain a previously generated hash) for the file. The file system 130 may pass the write command for an LBA and the file hash to the flash manager 140. The flash manager 140 may translate the LBA to a physical address for a block and write data corresponding to the write command to the flash memory 150 along with the file hash. The flash manager 140 may also generate an end-to-end tag (sometimes referred to as an E2E tag) for the physical address. The file hash (sometimes referred to as a user hash) may be written along with the E2E tag in the flash memory 150.

When a read request for the file is received from the host (e.g., the client application on the host), the file system 130 may generate (or retrieve) the file hash for the file identifier corresponding to the file and the one or more LBAs. The read request may be passed along with an LBA (as indicated by label 1 in FIG. 2) to the flash manager 140. Suppose the LBA corresponds to an address for physical block 0. The flash manager 140 may attempt to access the flash memory 150 for Block 0 (as indicated by label 2). Suppose further that, due to latching, the read request for Block 0 is misdirected to physical block 1. The flash memory 150 may return an E2E tag and a file hash stored for Block 1 (as indicated by label 3). The flash manager 140 may detect the E2E tag mismatch and perform a data recovery for the E2E mismatch to recover data for Block 0 (as indicated by label 4). When the mismatch is detected, the flash manager 140 may also pass the user hash retrieved for Block 1 along with the data recovered for Block 0 to the file system 130, as a response to the read request (as indicated by label 5). The file system 130 may determine that the user hash returned by the flash manager 140 does not correspond to a file identifier corresponding to the file for the read request. Based on this information, the file system 130 may initiate a read request for a second file whose hash matches the user hash determined by the flash manager 140. In this way, the file system 130 may recover the second file (indicated by label 6) without even receiving a read or write request (e.g., from the host) for the second file.

Figure 3:
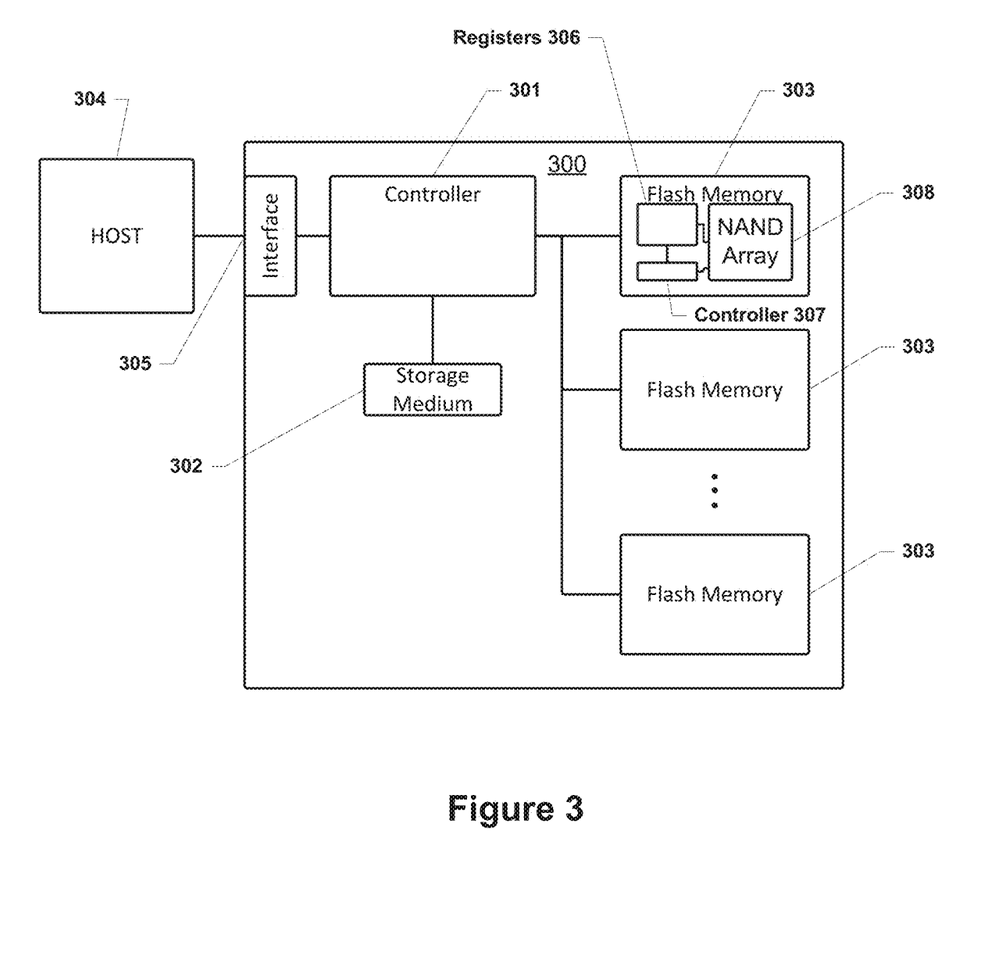
FIG. 3 is a block diagram illustrating components of an example data storage system, according to aspects of the subject technology.

FIG. 3 is a block diagram illustrating components of an example data storage system, according to aspects of the subject technology. A data storage system may be sometimes referred to as a system, a data storage device, a storage device, a solid-state drive, a drive, a flash storage system, a flash storage device, or a device. As depicted in FIG. 3, in some aspects, a data storage system 300 (e.g., a solid-state drive (SSD)) includes a data storage controller 301, a storage medium 302, and a flash memory array including one or more flash memory 303. The controller 301 may use the storage medium 302 for temporary storage of data and information used to manage the data storage system 300. The controller 301 may include several internal components (not shown), such as a read-only memory, other types of memory, a flash component interface (e.g., a multiplexer to manage instruction and data transport along a serial connection to the flash memory 303), an input/output (I/O) interface, error correction circuitry, and the like. In some aspects, the elements of the controller 301 may be integrated into a single chip. In other aspects, these elements may be separated on their own personal computer (PC) board.

In some implementations, aspects of the subject disclosure may be implemented in the data storage system 300. For example, aspects of the subject disclosure may be integrated with the function of the data storage controller 301 or may be implemented as separate components for use in conjunction with the data storage controller 301.

The controller 301 may also include a processor that may be configured to execute code or instructions to perform the operations and functionality described herein, manage request flow and address mappings, and to perform calculations and generate commands. The processor of the controller 301 may be configured to monitor and/or control the operation of the components in the data storage controller 301. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 301 and/or its processor. One or more sequences of instructions may be software stored and read from the storage medium 302, the flash memory 303, or received from a host device 304 (e.g., via a host interface 305). ROM, the storage medium 302, the flash memory 303, represent examples of machine or computer readable media on which instructions/code executable by the controller 301 and/or its processor may be stored. Machine or computer readable media may generally refer to any medium or media used to provide instructions to the controller 301 and/or its processor, including volatile media, such as dynamic memory used for the storage media 302 or for buffers within the controller 301, and non-volatile media, such as electronic media, optical media, and magnetic media.

In some aspects, the controller 301 may be configured to store data received from the host device 304 in the flash memory 303 in response to a write command from the host device 304. The controller 301 is further configured to read data stored in the flash memory 303 and to transfer the read data to the host device 304 in response to a read command from the host device 304. A host device 304 may be sometimes referred to as a host, a host system, or a host computer.

The host device 304 represents any device configured to be coupled to the data storage system 300 and to store data in the data storage system 300. The host device 304 may be a computing system such as a personal computer, a server, a workstation, a laptop computer, a personal digital assistant (PDA), a smart phone, or the like. Alternatively, the host device 304 may be an electronic device such as a digital camera, a digital audio player, a digital video recorder, or the like.

In some aspects, the storage medium 302 represents volatile memory used to temporarily store data and information used to manage the data storage system 300. According to aspects of the subject technology, the storage medium 302 is random access memory (RAM), such as double data rate (DDR) RAM. Other types of RAMs may be also used to implement the storage medium 302. The memory 302 may be implemented using a single RAM module or multiple RAM modules. While the storage medium 302 is depicted as being distinct from the controller 301, those skilled in the art will recognize that the storage medium 302 may be incorporated into the controller 301 without departing from the scope of the subject technology. Alternatively, the storage medium 302 may be a non-volatile memory, such as a magnetic disk, flash memory, peripheral SSD, and the like.

As further depicted in FIG. 3, the data storage system 300 may also include the host interface 305. The host interface 305 may be configured to be operably coupled (e.g., by wired or wireless connection) to the host device 304, to receive data from the host device 304 and to send data to the host device 304. The host interface 305 may include electrical and physical connections, or a wireless connection, for operably coupling the host device 304 to the controller 301 (e.g., via the I/O interface of the controller 301). The host interface 305 may be configured to communicate data, addresses, and control signals between the host device 304 and the controller 301. Alternatively, the I/O interface of the controller 301 may include and/or be combined with the host interface 305. The host interface 305 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 305 may be configured to implement only one interface. Alternatively, the host interface 305 (and/or the I/O interface of controller 301) may be configured to implement multiple interfaces, which may be individually selectable using a configuration parameter selected by a user or programmed at the time of assembly. The host interface 305 may include one or more buffers for buffering transmissions between the host device 304 and the controller 301.

The flash memory 303 may represent a non-volatile memory device for storing data. According to aspects of the subject technology, the flash memory 303 includes, for example, a NAND flash memory. The flash memory 303 may include a single flash memory device or chip, or (as depicted in FIG. 3) may include multiple flash memory devices or chips arranged in multiple channels. The flash memory 303 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 303 is used to access one or more internal registers 306 and an internal flash controller 307 for communication by external devices (e.g., the controller 301). In some aspects, the registers 306 may include address, command, and/or data registers, which internally retrieve and output the necessary data to and from a NAND memory cell array 308. A NAND memory cell array 308 may be sometimes referred to as a NAND array, a NAND memory, a NAND flash memory, a memory array, or a NAND. For example, a data register may include data to be stored in the memory array 308, or data after a fetch from the memory array 308 and may also be used for temporary data storage and/or act like a buffer. An address register may store the memory address from which data will be fetched to the host device 304 or the address to which data will be sent and stored. In some aspects, a command register is included to control parity, interrupt control, and the like. In some aspects, the internal flash controller 307 is accessible via a control register to control the general behaviour of the flash memory 303. The internal flash controller 307 and/or the control register may control the number of stop bits, word length, receiver clock source, and may also control switching the addressing mode, paging control, coprocessor control, and the like.

In some aspects, the registers 306 may also include a test register. The test register may be accessed by specific addresses and/or data combinations provided at the interface of flash memory 303 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 303 (e.g., read levels) to dynamically vary how data is read from the memory cells of the memory arrays 308. The registers 306 may also include one or more data latches coupled to the flash memory 303.

It should be understood that in all cases data may not always be the result of a command received from the host 304 and/or returned to the host 304. In some aspects, the controller 301 may be configured to execute a read operation independent of the host 404 (e.g., to verify read levels or the bit error rate (BER)). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 301 may perform the operations identified in blocks 402-428 and/or blocks 502-516. The controller 301 may cause the operations identified in 402-428 and/or blocks 502-516 to occur, or the controller 301 may provide instructions to cause or facilitate the controller 307 (and the registers 306) to perform operations identified in blocks 402-428 and/or blocks 502-516.

Figure 4A:
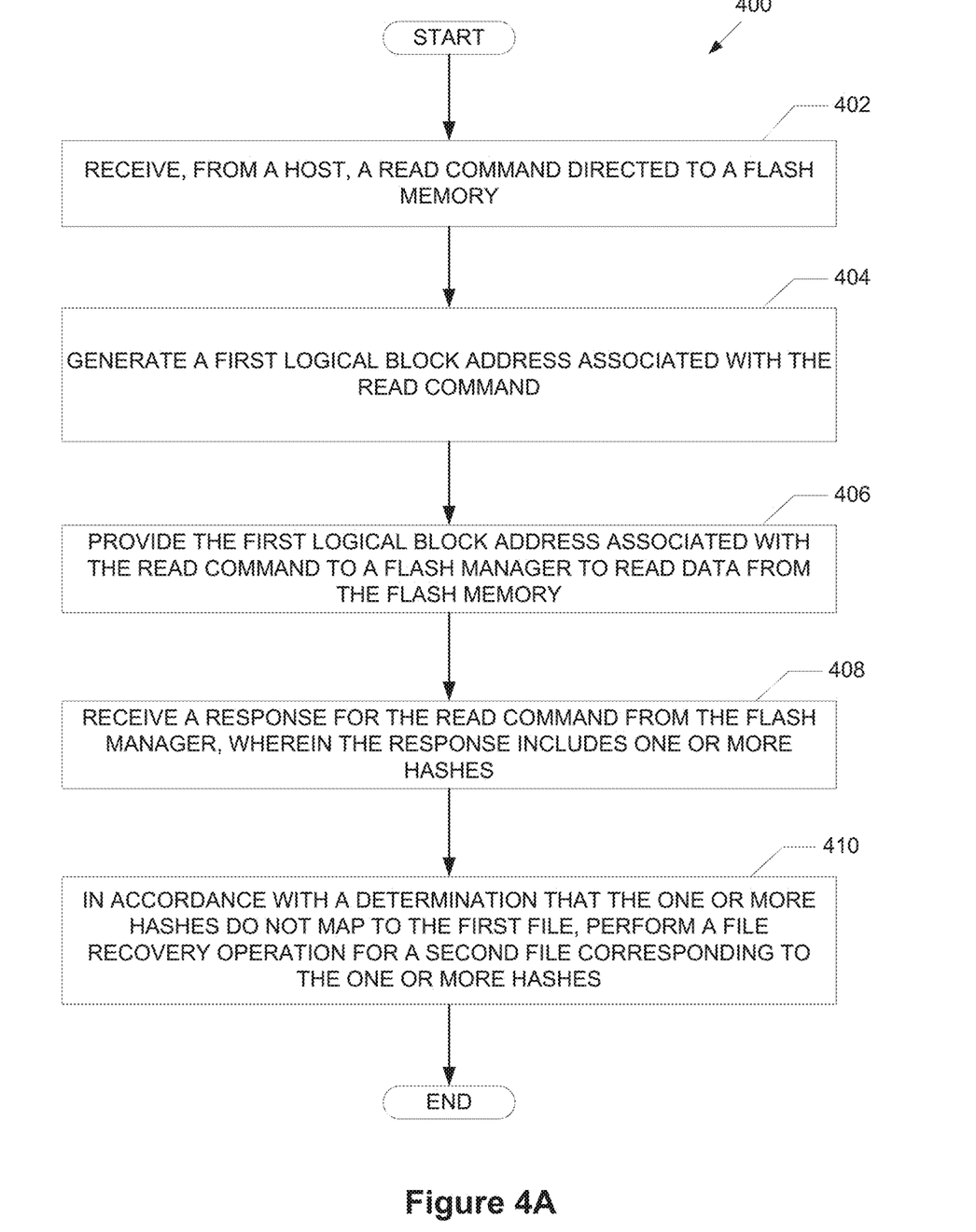
FIGS. 4A-4C are flowcharts illustrating an example process for proactively hardening a data storage system, according to one or more embodiments.
Figure 4B:
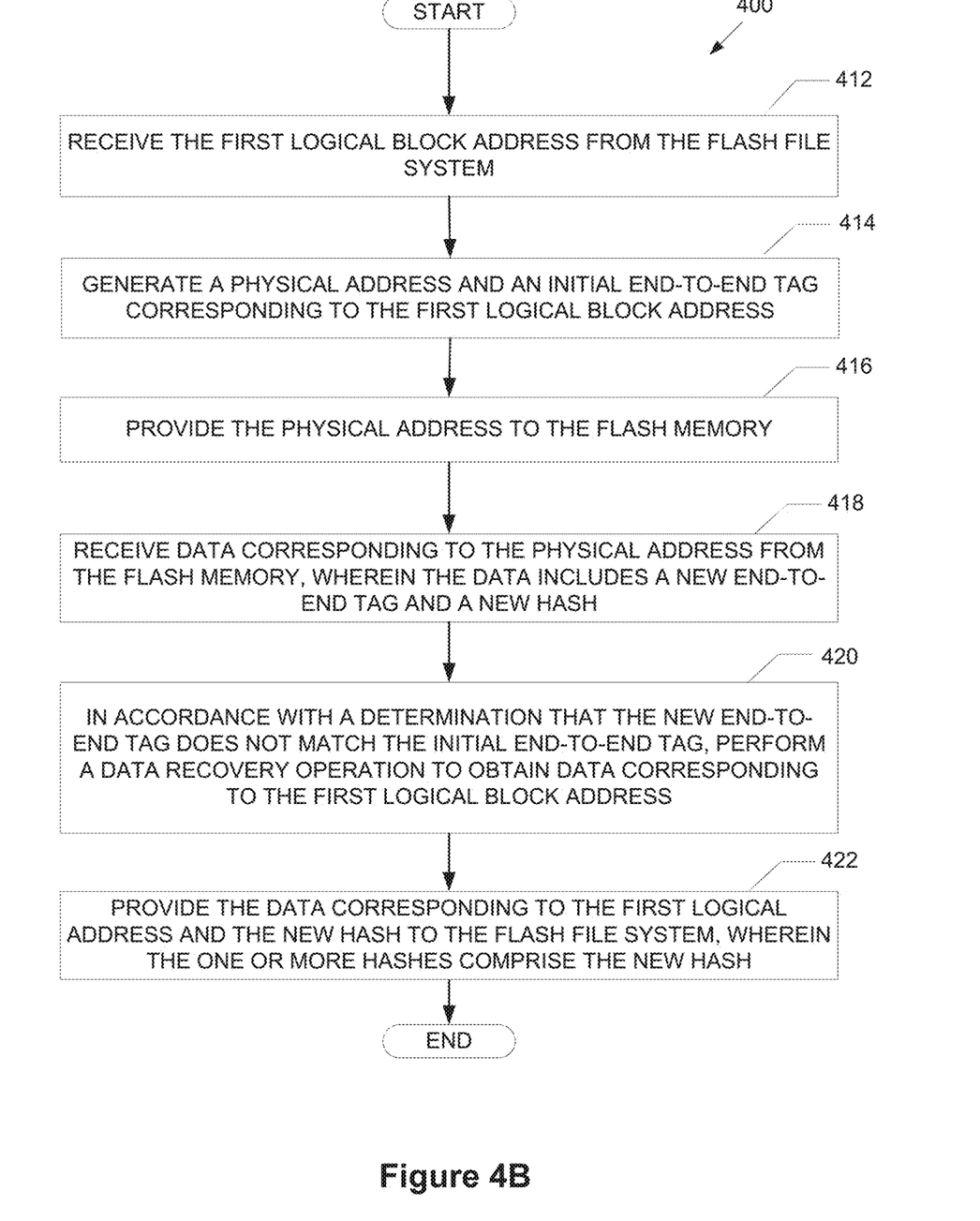
Figure 4C:
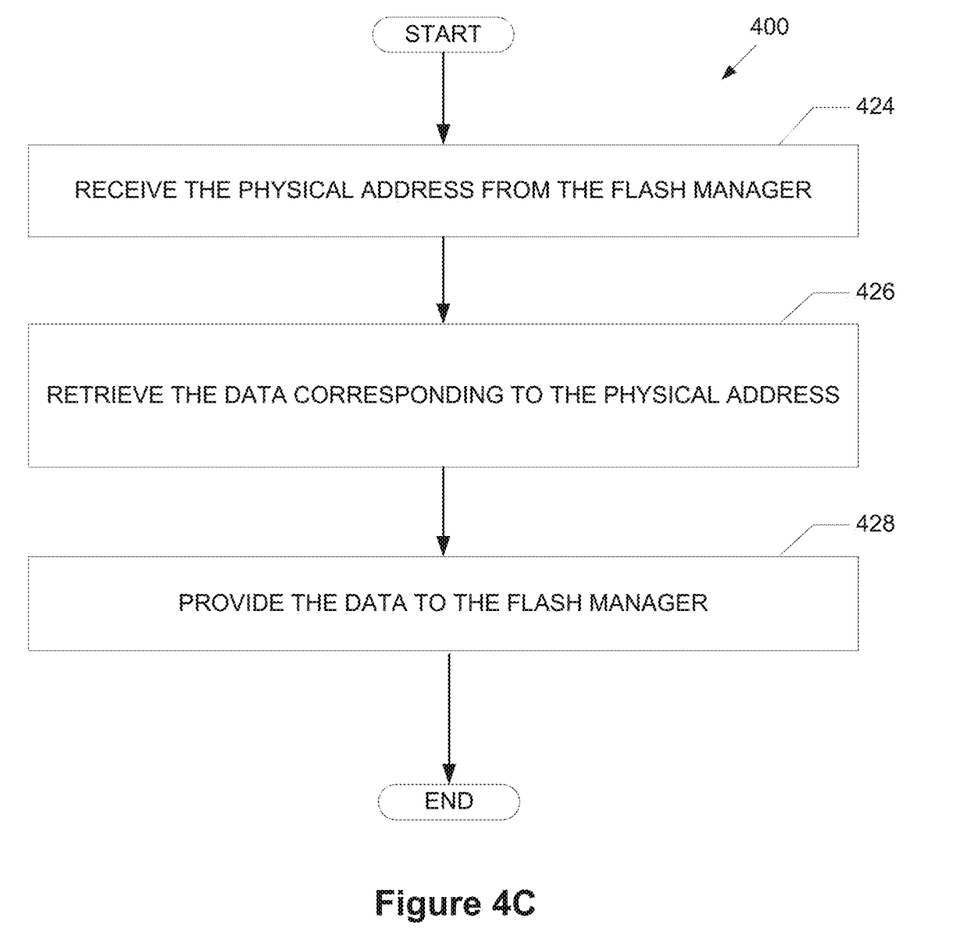

It may be instructive to describe the structures shown in FIGS. 1A, 1B, 1C, 2A, 2B and 3, with respect to FIGS. 4A-4C, which provide flowcharts illustrating an example process 400 for proactively hardening a data storage system (which includes, e.g., a flash file system), according to one or more embodiments.

One or more blocks of FIGS. 4A-4C may be executed by a computing system (including, e.g., a controller of a flash memory, a data storage controller of a data storage system or a solid state storage device (SSD), a processor, or the like). Examples of a computing system or a controller may be the controller 301. Similarly, a non-transitory machine-readable medium (e.g., 302) may include machine-executable instructions thereon that, when executed by a computer, machine or controller (e.g., 301 or 307), perform the blocks of FIGS. 4A-4C. The steps of process 400 may be implemented as hardware, firmware, software, or a combination thereof. For example, a data storage device (e.g., the storage device 300) may include a device memory (e.g., the memory 303) and a controller (e.g., the controller 301).

In some aspects, a data storage system includes a flash file system (e.g., the flash file system 130), a flash manager (e.g., the flash manager 140), and a flash memory (e.g., the flash memory 150). Referring to FIG. 4A, the flash file system may be configured to receive (402), from a host, a read command directed to a flash memory. The read command may include a first file identifier for a first file. The flash file system may also be configured to generate (404) a first logical block address associated with the read command. The flash file system may also be configured to provide (406) the first logical block address associated with the read command to a flash manager to read data from the flash memory. The flash file system may also be configured to receive (408) a response for the read command from the flash manager, wherein the response includes one or more hashes. The flash file system may also be configured to, in accordance with a determination that the one or more hashes do not map to the first file, perform (410) a file recovery operation for a second file corresponding to the one or more hashes.

Referring next to FIG. 4B, the flash manager may be configured to receive (412) the first logical block address from the flash file system. The flash manager may also be configured to generate (414) a physical address and an initial end-to-end tag corresponding to the first logical block address. The flash manager may also be configured to provide (416) the physical address to the flash memory. The flash manager may also be configured to receive (418) data corresponding to the physical address from the flash memory. The data may include a new end-to-end tag and a new hash. The flash manager may also be configured to, in accordance with a determination that the new end-to-end tag does not match the initial end-to-end tag, perform (420) a data recovery operation to obtain data corresponding to the first logical block address. A mismatch between the initial end-to-end tag and the new end-to-end tag may indicates that the data is retrieved from a second logical block address different from the first logical block address. The flash manager may also be configured to provide (422) the data corresponding to the first logical address and the new hash to the flash file system. The one or more hashes include the new hash.

Referring next to FIG. 4C, the flash memory may be configured to: receive (424) the physical address from the flash manager; retrieve (426) the data corresponding to the physical address; and provide (428) the data to the flash manager.

In some aspects, the flash file system may be further configured to receive, from the host, a write command directed to the flash memory. The write command may include the first file identifier. The flash file system may be further configured to generate a file hash associated with the first logical block address, and provide the file hash to the flash manager. The flash manager may be further configured to: receive the file hash from the flash file system; and provide the file hash and the write command, to the flash memory. The flash memory may be further configured to receive the write command and the file hash, from the flash manager, and store the file hash, for the first logical block address.

Figure 5A:
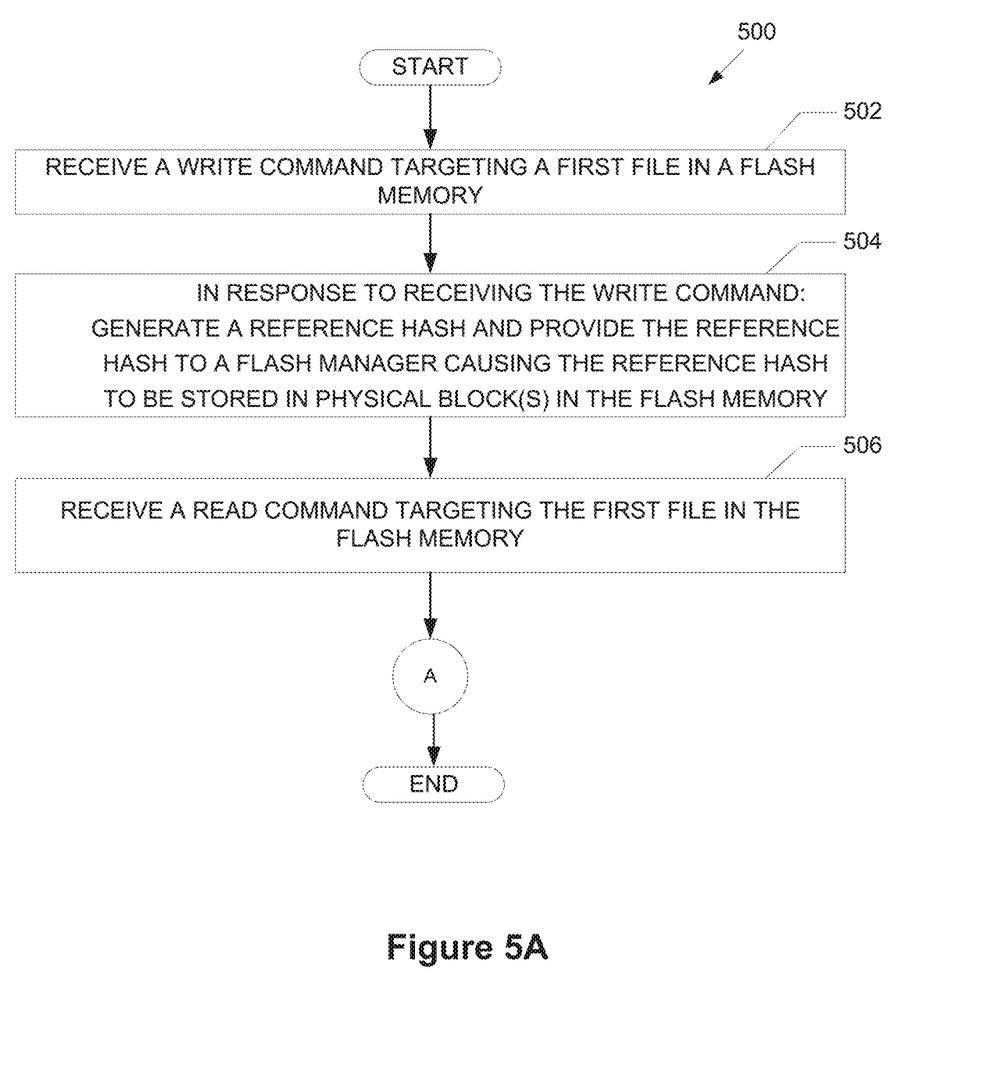
FIGS. 5A and 5B are flowcharts illustrating another example process for proactively hardening a data storage system, according to one or more embodiments.
Figure 5B:
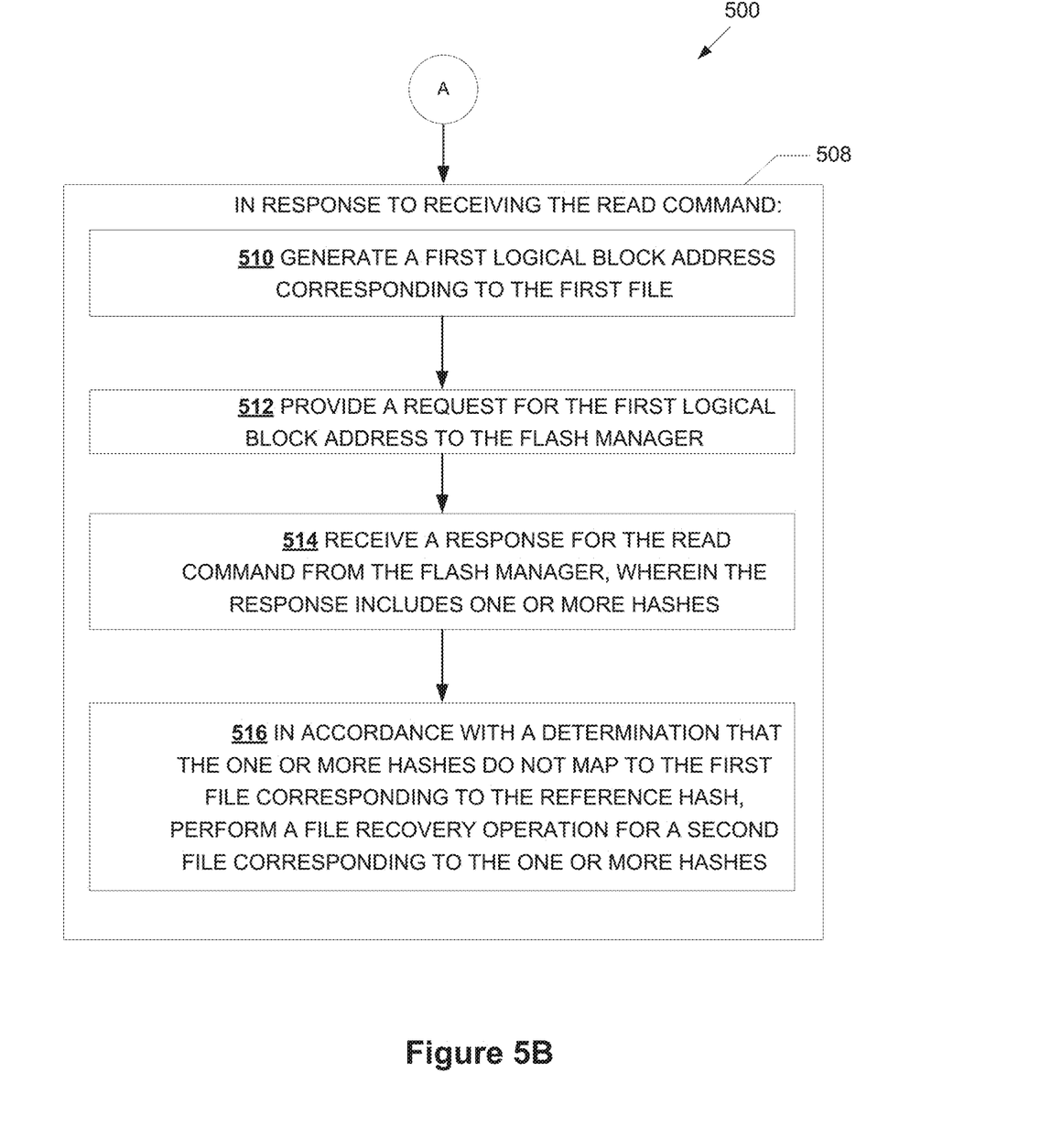

It may also be instructive to describe the structures shown in FIGS. 1A, 1B, 1C, 2A, 2B and 3, with respect to FIGS. 5A and 5B, which are flowcharts illustrating another example process 500 for proactively hardening a data storage system (which includes, e.g., a flash file system), according to one or more embodiments.

One or more blocks of FIGS. 5A and 5B may be executed by a computing system (including, e.g., a controller of a flash memory, a data storage controller of a data storage system or a solid state storage device (SSD), a processor, or the like). Examples of a computing system or a controller may be the controller 301. Similarly, a non-transitory machine-readable medium (e.g., 302) may include machine-executable instructions thereon that, when executed by a computer, machine or controller (e.g., 301), perform the blocks of FIGS. 5A and 5B. The steps of process 500 may be implemented as hardware, firmware, software, or a combination thereof. For example, a data storage device (e.g., the storage device 300) may include a device memory (e.g., the memory 303) and a controller (e.g., the controller 301).

In some aspects, the data storage system may include a flash file system (e.g., the flash file system 130). Referring to FIG. 5A, the flash file system may be configured to receive (502) a write command targeting a first file in a flash memory (e.g., the flash memory 150). The flash file system may also be configured to: in response to receiving the write command (504): generate a reference hash corresponding to the first file, and provide the reference hash to a flash manager (e.g., the flash manager 140) causing the reference hash to be stored in one or more physical blocks in the flash memory. The flash file system may also be configured to: receive (506) a read command targeting the first file in the flash memory. Referring next to FIG. 5B, the flash file system may also be configured to: in response to receiving the read command (508): generate (510) a first logical block address corresponding to the first file; provide (512) a request for the first logical block address to the flash manager; receive (514) a response for the read command from the flash manager. The response may include one or more hashes; and in accordance with a determination that the one or more hashes do not map to the first file corresponding to the reference hash, perform (516) a file recovery operation for a second file corresponding to the one or more hashes.

In some aspects, the data storage system may include the flash file system (e.g., the flash manager 140). The flash manager may be configured to: receive the reference hash from the flash file system; provide the reference hash to the flash memory; receive the request for the first logical block address in the flash memory; generate a physical address and an initial end-to-end tag corresponding to the first logical block address; provide the physical address to the flash memory; receive data corresponding to the physical address from the flash memory. The data may include a new end-to-end tag and a new hash; in accordance with a determination that the new end-to-end tag does not match the initial end-to-end tag, perform a data recovery operation to obtain data corresponding to the first logical block address. A mismatch between the initial end-to-end tag and the new end-to-end tag may indicate that the data is retrieved from a second logical block address different from the first logical block address; and provide the data corresponding to the first logical address and the new hash to the flash file system. The one or more hashes may include the new hash.

In some aspects, the storage system may include the flash memory (e.g., the flash memory 150). The flash memory may be configured to: receive the reference hash from the flash manager; store the reference hash in one or more physical blocks; receive the physical address from the flash manager; retrieve the data corresponding to the physical address. The data includes the new end-to-end tag and the new hash; and provide the data to the flash manager.

In some aspects, the one or more hashes do not map to the first file corresponding to the reference hash because of latching in the flash memory that causes the request for the first logical block address to be misdirected to a second logical block address corresponding to the second file.

In some aspects, the second file is accessed by a host at a lower frequency than the first file.

In some aspects, the flash manager is configured to provide the new hash to the flash file system in accordance with the determination that the new end-to-end tag does not match the initial end-to-end tag.

In some aspects, the flash file system is configured to: in accordance with the determination that the one or more hashes do not map to the first file corresponding to the reference hash: rebalance data portions associated with a second logical block address corresponding to the second file before receiving a read command for data corresponding to the second logical block address.

In some aspects, the flash file system is configured to: in accordance with the determination that the one or more hashes do not map to the first file corresponding to the reference hash: perform a corrective action on a second logical block address corresponding to the second file, without receiving a read command for data corresponding to the second logical block address. For example, the flash file system and/or the flash manager may read the second file or second logical block address. If data corresponding to the first file or its corresponding logical block address is cached, then the flash file system and/or the flash manager may write the first file. If the data in the first file or it corresponding logical block address is not cached but can be recovered by virtue of redundancy or other recovery means, then the flash file system and/or the flash manager may initiate data recovery algorithms and write the first file.

In some aspects, the flash file system is configured to: in accordance with the determination that the one or more hashes do not map to the first file corresponding to the reference hash: provide information to a host causing the host to take corrective action on a second logical block address corresponding to the second file. For example, a file system of the host may read the data from a secondary copy. The file system may also recover the data using existing data recovery mechanisms and/or write the data again.

In some aspects, the flash file system is configured to: in accordance with the determination that the one or more hashes do not map to the first file corresponding to the reference hash: cause moving data from the flash memory to another flash memory.

In some aspects, the flash file system is configured to: in accordance with the determination that the one or more hashes do not map to the first file corresponding to the reference hash: in accordance with a determination that a second logical block address corresponding to the second file is associated with a snapshot, trigger a new snapshot. This may be useful in file systems that use snapshots (e.g., special files) to store information related to last known good data.

In some aspects, the flash file system is configured to: in accordance with the determination that the one or more hashes do not map to the first file corresponding to the reference hash: provide, to a host, information corresponding to a second logical block address corresponding to the second file, on completion of the read command.

In one or more examples, a data storage system 300 of FIG. 3 may include any one of the data storage system 100A, 100B, 100C or 200 of FIGS. 1A-1C and 2 and vice versa. In one or more examples, a controller (e.g., 301 of FIG. 3) may include some or all of the components (e.g., 130, 140, 124, and 126 of FIGS. 1A-1C and 2). In another example, a controller (e.g., 307 of FIG. 3) may include some or all of the components (e.g., 130, 140, 124, and 126 of FIGS. 1A-1C and 2). In one or more examples, the flash memory 303 of FIG. 3 (or a NAND memory 308) may include the flash memory 150 of FIGS. 1A-1C and 2.

In one or more examples, a flash file system (e.g., 130 of FIG. 2) may perform the blocks 402 to 410 of FIG. 4A and/or the blocks 502-516 of FIGS. 5A-5B. In one or more examples, a flash manager (e.g., 140 of FIG. 2) may perform the blocks 412-422 of FIG. 4B. In one or more examples, a controller (e.g., 301 of FIG. 3 or its component such as a flash manager 140) may cause a flash memory (e.g., 150 of FIG. 2) to perform the blocks 424-428 of FIG. 4C. In one or more examples, a flash memory (e.g., 150 of FIG. 2) may perform the blocks 424-428 of FIG. 4C.

Various examples of aspects of the disclosure are described below. These are provided as examples, and do not limit the subject technology.

One or more aspects of the subject technology provide a storage system that may include a flash file system, a flash manager, and a flash memory. The flash file system may be configured to: receive, from a host, a read command directed to a flash memory, wherein the read command comprises a first file identifier for a first file; generate a first logical block address associated with the read command; provide the first logical block address associated with the read command to a flash manager to read data from the flash memory; receive a response for the read command from the flash manager, wherein the response includes one or more hashes; and in accordance with a determination that the one or more hashes do not map to the first file, perform a file recovery operation for a second file corresponding to the one or more hashes. The flash manager may be configured to: receive the first logical block address from the flash file system; generate a physical address and an initial end-to-end tag corresponding to the first logical block address; provide the physical address to the flash memory; receive data corresponding to the physical address from the flash memory. The data includes a new end-to-end tag and a new hash; in accordance with a determination that the new end-to-end tag does not match the initial end-to-end tag, perform a data recovery operation to obtain data corresponding to the first logical block address. A mismatch between the initial end-to-end tag and the new end-to-end tag indicates that the data is retrieved from a second logical block address different from the first logical block address; and provide the data corresponding to the first logical address and the new hash to the flash file system, wherein the one or more hashes comprise the new hash. The flash memory may be configured to: receive the physical address from the flash manager; retrieve the data corresponding to the physical address; and provide the data to the flash manager.

In other aspects, a storage system may include a flash file system that may be configured to: receive a write command targeting a first file in a flash memory; in response to receiving the write command: generate a reference hash corresponding to the first file; and provide the reference hash to a flash manager causing the reference hash to be stored in one or more physical blocks in the flash memory; receive a read command targeting the first file in the flash memory; and in response to receiving the read command: generate a first logical block address corresponding to the first file; provide a request for the first logical block address to the flash manager; receive a response for the read command from the flash manager. The response includes one or more hashes; and in accordance with a determination that the one or more hashes do not map to the first file corresponding to the reference hash, perform a file recovery operation for a second file corresponding to the one or more hashes.

In other aspects, methods are provided for proactively hardening a flash storage system. According to some aspects, a method may include, at a flash file system: receiving, from a host, a read command directed to a flash memory, wherein the read command comprises a first file identifier for a first file; generating a first logical block address associated with the read command; providing the first logical block address associated with the read command to a flash manager to read data from the flash memory; receiving a response for the read command from the flash manager, wherein the response includes one or more hashes; and in accordance with a determination that the one or more hashes do not map to the first file, performing a file recovery operation for a second file corresponding to the one or more hashes. The method may also include, at the flash manager: receiving the first logical block address from the flash file system; generating a physical address and an initial end-to-end tag corresponding to the first logical block address; providing the physical address to the flash memory; receiving data corresponding to the physical address from the flash memory, wherein the data includes a new end-to-end tag and a new hash; in accordance with a determination that the new end-to-end tag does not match the initial end-to-end tag, performing a data recovery operation to obtain data corresponding to the first logical block address, wherein a mismatch between the initial end-to-end tag and the new end-to-end tag indicates that the data is retrieved from a second logical block address different from the first logical block address; and providing the data corresponding to the first logical address and the new hash to the flash file system, wherein the one or more hashes comprise the new hash. The method may also include, at the flash memory: receiving the physical address from the flash manager; retrieving the data corresponding to the physical address; and providing the data to the flash manager.

According to some aspects, a method may include, at a flash file system: receiving a write command targeting a first file in a flash memory; in response to receiving the write command: generating a reference hash corresponding to the first file; and providing the reference hash to a flash manager causing the reference hash to be stored in one or more physical blocks in the flash memory; receiving a read command targeting the first file in the flash memory; and in response to receiving the read command: generating a first logical block address corresponding to the first file; providing a request for the first logical block address to the flash manager; receiving a response for the read command from the flash manager, wherein the response includes one or more hashes; and in accordance with a determination that the one or more hashes do not map to the first file corresponding to the reference hash, performing a file recovery operation for a second file corresponding to the one or more hashes In further aspects, a system may include: means for means for receiving a write command targeting a first file in a flash memory; means for, in response to receiving the write command: generating a reference hash corresponding to the first file; and providing the reference hash to a flash manager causing the reference hash to be stored in one or more physical blocks in the flash memory; means for receiving a read command targeting the first file in the flash memory; and means for, in response to receiving the read command: generating a first logical block address corresponding to the first file; providing a request for the first logical block address to the flash manager; receiving a response for the read command from the flash manager, wherein the response includes one or more hashes; and in accordance with a determination that the one or more hashes do not map to the first file corresponding to the reference hash, performing a file recovery operation for a second file corresponding to the one or more hashes.

Various implementations of the methods and systems for proactively biasing parameters of data storage device based on spatial position in storage enclosure provides several performance advantages that improve the functioning of the storage device or SSD. A host computer that interfaces with the storage device is also provided with improved functioning by operating the storage device with higher performance and storage capacity. Thus, the described methods and systems provide performance benefits that improve the functioning of a storage device and a host computer.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A storage system, comprising:
a flash file system configured to:
  receive a write command targeting a first file in a flash memory;
  in response to receiving the write command:
    generate a reference hash corresponding to the first file; and
    provide the reference hash to a flash manager causing the reference hash to be stored in one or more physical blocks in the flash memory;
  receive a read command targeting the first file in the flash memory; and
  in response to receiving the read command:
    generate a first logical block address corresponding to the first file;
    provide a request for the first logical block address to the flash manager;
    receive a response for the read command from the flash manager, wherein the response includes one or more hashes; and
    in accordance with a determination that the one or more hashes do not map to the first file corresponding to the reference hash, perform a file recovery operation for a second file corresponding to the one or more hashes.

2. The storage system of claim 1, further comprising:
the flash manager configured to:
  receive the reference hash from the flash file system;
  provide the reference hash to the flash memory;
  receive the request for the first logical block address in the flash memory;
  generate a physical address and an initial end-to-end tag corresponding to the first logical block address;
  provide the physical address to the flash memory;
  receive data corresponding to the physical address from the flash memory, wherein the data includes a new end-to-end tag and a new hash;
  in accordance with a determination that the new end-to-end tag does not match the initial end-to-end tag, perform a data recovery operation to obtain data corresponding to the first logical block address, wherein a mismatch between the initial end-to-end tag and the new end-to-end tag indicates that the data is retrieved from a second logical block address different from the first logical block address; and
  provide the data corresponding to the first logical block address and the new hash to the flash file system, wherein the one or more hashes comprise the new hash.

3. The storage system of claim 2, further comprising:
the flash memory configured to:
  receive the reference hash from the flash manager;
  store the reference hash in one or more physical blocks;
  receive the physical address from the flash manager;
  retrieve the data corresponding to the physical address, wherein the data includes the new end-to-end tag and the new hash; and
  provide the data to the flash manager.

4. The storage system of claim 1, wherein the one or more hashes do not map to the first file corresponding to the reference hash because of latching in the flash memory that causes the request for the first logical block address to be misdirected to a second logical block address corresponding to the second file.

5. The storage system of claim 1, wherein the second file is accessed by a host at a lower frequency than the first file.

6. The storage system of claim 2, wherein the flash manager is configured to provide the new hash to the flash file system in accordance with the determination that the new end-to-end tag does not match the initial end-to-end tag.

7. The storage system of claim 1, wherein the flash file system is configured to:
  in accordance with the determination that the one or more hashes do not map to the first file corresponding to the reference hash:
    rebalance data portions associated with a second logical block address corresponding to the second file before receiving a read command for data corresponding to the second logical block address.

8. The storage system of claim 1, wherein the flash file system is configured to:
  in accordance with the determination that the one or more hashes do not map to the first file corresponding to the reference hash:
    perform a corrective action on a second logical block address corresponding to the second file, without receiving a read command for data corresponding to the second logical block address.

9. The storage system of claim 1, wherein the flash file system is configured to:
  in accordance with the determination that the one or more hashes do not map to the first file corresponding to the reference hash:
    provide information to a host causing the host to take corrective action on a second logical block address corresponding to the second file.

10. The storage system of claim 1, wherein the flash file system is configured to:
  in accordance with the determination that the one or more hashes do not map to the first file corresponding to the reference hash:
    cause moving data from the flash memory to another flash memory.

11. The storage system of claim 1, wherein the flash file system is configured to:
  in accordance with the determination that the one or more hashes do not map to the first file corresponding to the reference hash:
    in accordance with a determination that a second logical block address corresponding to the second file falls on a snapshot, trigger a new snapshot.

12. The storage system of claim 1, wherein the flash file system is configured to:
  in accordance with the determination that the one or more hashes do not map to the first file corresponding to the reference hash:
    provide, to a host, information corresponding to a second logical block address corresponding to the second file, on completion of the read command.

13. A method for proactive hardening of flash storage devices, the method comprising:
at a flash file system:
  receiving a write command targeting a first file in a flash memory;
  in response to receiving the write command:
    generating a reference hash corresponding to the first file; and
    providing the reference hash to a flash manager causing the reference hash to be stored in one or more physical blocks in the flash memory;
  receiving a read command targeting the first file in the flash memory; and
  in response to receiving the read command:

generating a first logical block address corresponding to the first file;
providing a request for the first logical block address to the flash manager;
receiving a response for the read command from the flash manager, wherein the response includes one or more hashes; and
in accordance with a determination that the one or more hashes do not map to the first file corresponding to the reference hash, performing a file recovery operation for a second file corresponding to the one or more hashes.

14. The method of claim 13, further comprising:
at the flash manager:
receiving the reference hash from the flash file system;
providing the reference hash to the flash memory;
receiving the request for the first logical block address in the flash memory;
generating a physical address and an initial end-to-end tag corresponding to the first logical block address;
providing the physical address to the flash memory;
receiving data corresponding to the physical address from the flash memory, wherein the data includes a new end-to-end tag and a new hash;
in accordance with a determination that the new end-to-end tag does not match the initial end-to-end tag, performing a data recovery operation to obtain data corresponding to the first logical block address, wherein a mismatch between the initial end-to-end tag and the new end-to-end tag indicates that the data is retrieved from a second logical block address different from the first logical block address; and
providing the data corresponding to the first logical block address and the new hash to the flash file system, wherein the one or more hashes comprise the new hash.

15. The method of claim 14, further comprising:
at the flash memory:
receiving the reference hash from the flash manager;
storing the reference hash in one or more physical blocks;
receiving the physical address from the flash manager;
retrieving the data corresponding to the physical address, wherein the data includes the new end-to-end tag and the new hash; and
providing the data to the flash manager.

16. The method of claim 13, wherein the one or more hashes do not map to the first file corresponding to the reference hash because of latching in the flash memory that causes the request for the first logical block address to be misdirected to a second logical block address corresponding to the second file.

17. The method of claim 13, wherein the second file is accessed by a host at a lower frequency than the first file.

18. The method of claim 14, wherein the flash manager provides the new hash to the flash file system in accordance with the determination that the new end-to-end tag does not match the initial end-to-end tag.

19. The method of claim 13, further comprising:
at the flash file system:
in accordance with the determination that the one or more hashes do not map to the first file corresponding to the reference hash:
rebalancing data portions associated with a second logical block address corresponding to the second file before receiving a read command for data corresponding to the second logical block address.

20. A system, comprising:
means for receiving a write command targeting a first file in a flash memory;
means for, in response to receiving the write command:
generating a reference hash corresponding to the first file; and
providing the reference hash to a flash manager causing the reference hash to be stored in one or more physical blocks in the flash memory;
means for receiving a read command targeting the first file in the flash memory; and
means for, in response to receiving the read command:
generating a first logical block address corresponding to the first file;
providing a request for the first logical block address to the flash manager;
receiving a response for the read command from the flash manager, wherein the response includes one or more hashes; and
in accordance with a determination that the one or more hashes do not map to the first file corresponding to the reference hash, performing a file recovery operation for a second file corresponding to the one or more hashes.

* * * * *